United States Patent
Stern et al.

(10) Patent No.: US 8,855,470 B2
(45) Date of Patent: Oct. 7, 2014

(54) USE OF MULTIPLE EMBEDDED MESSAGES IN PROGRAM SIGNAL STREAMS

(75) Inventors: Peter Stern, Riverside, CT (US); Melinda Witmer, Scarsdale, NY (US)

(73) Assignee: Time Warner Cable Enterprises LLC, New York, NY (US)

(*) Notice: Subject to any disclaimer, the term of this patent is extended or adjusted under 35 U.S.C. 154(b) by 761 days.

(21) Appl. No.: 12/754,680

(22) Filed: Apr. 6, 2010

(65) Prior Publication Data

US 2011/0243533 A1    Oct. 6, 2011

(51) Int. Cl.
| | | |
|---|---|---|
| H04N 9/80 | (2006.01) | |
| H04N 21/81 | (2011.01) | |
| H04N 21/8355 | (2011.01) | |
| H04N 21/262 | (2011.01) | |
| H04N 21/442 | (2011.01) | |
| H04N 21/258 | (2011.01) | |
| H04N 21/254 | (2011.01) | |

(52) U.S. Cl.
CPC ......... *H04N 21/812* (2013.01); *H04N 21/8355* (2013.01); *H04N 21/26258* (2013.01); *H04N 21/44213* (2013.01); *H04N 21/25866* (2013.01); *H04N 21/2541* (2013.01)
USPC .......................................... 386/249; 386/291

(58) Field of Classification Search
USPC ............ 386/231, 243, 249–251, 299; 725/32, 725/34, 36
See application file for complete search history.

(56) References Cited

U.S. PATENT DOCUMENTS

| | | | | |
|---|---|---|---|---|
| 6,404,977 | B1* | 6/2002 | Iggulden | 386/248 |
| 8,290,351 | B2* | 10/2012 | Plotnick et al. | 386/344 |
| 8,375,407 | B2* | 2/2013 | Tsuchida et al. | 725/36 |
| 2002/0194595 | A1* | 12/2002 | Miller et al. | 725/36 |
| 2003/0115595 | A1* | 6/2003 | Stevens et al. | 725/32 |
| 2006/0013555 | A1* | 1/2006 | Poslinski | 386/46 |
| 2007/0053653 | A1* | 3/2007 | Huntington | 386/46 |
| 2008/0134236 | A1* | 6/2008 | Iijima et al. | 725/34 |
| 2010/0005487 | A1* | 1/2010 | Tsai | 725/32 |
| 2010/0180289 | A1* | 7/2010 | Barsook et al. | 725/29 |

* cited by examiner

*Primary Examiner* — Hung Dang
*Assistant Examiner* — Mishawn Dunn
(74) *Attorney, Agent, or Firm* — Straub & Pokotylo; Michael P. Straub; Stephen T. Straub

(57) ABSTRACT

Methods of generating video streams including advertisement information sufficient to support advertisement countdown times and other functions such as advertisement auto pause functions are described. In accordance with various embodiments, advertisement duration is determined from one or more messages included in a video stream, e.g., prior to the corresponding advertising segment. A countdown timer is generated from the advertisement information and displayed along with the content of the advertisement segment. Restrictions for different subscribers may be indicated in the advertisement information messages, e.g., with some end users being permitted to fast forward or skip advertisements with other users being required to allow the full normal playback of one or more advertisement segments. The auto pause function, when activated, pauses an ad segment or set of ad segments at a predetermined time before output of the main program resumes thereby making sure none of the main program is missed.

21 Claims, 7 Drawing Sheets

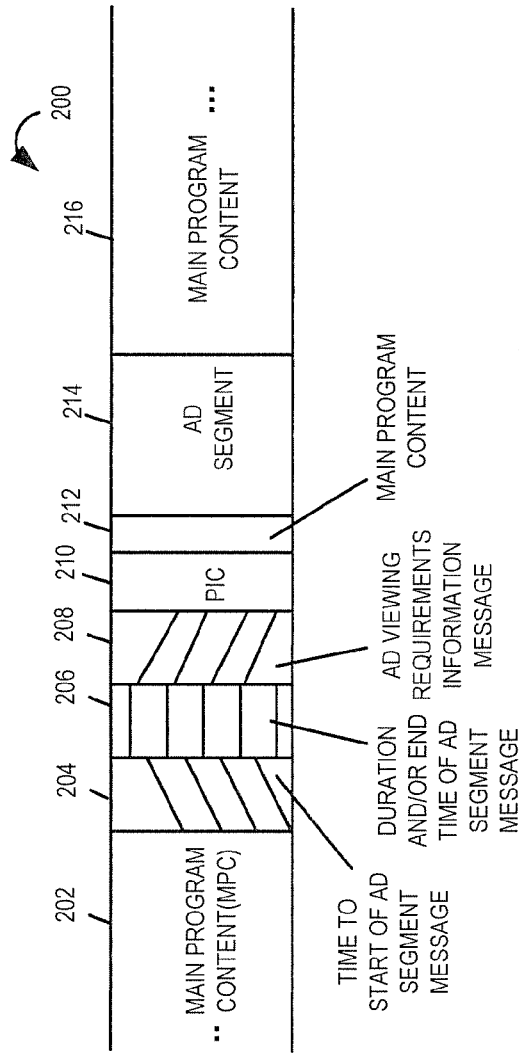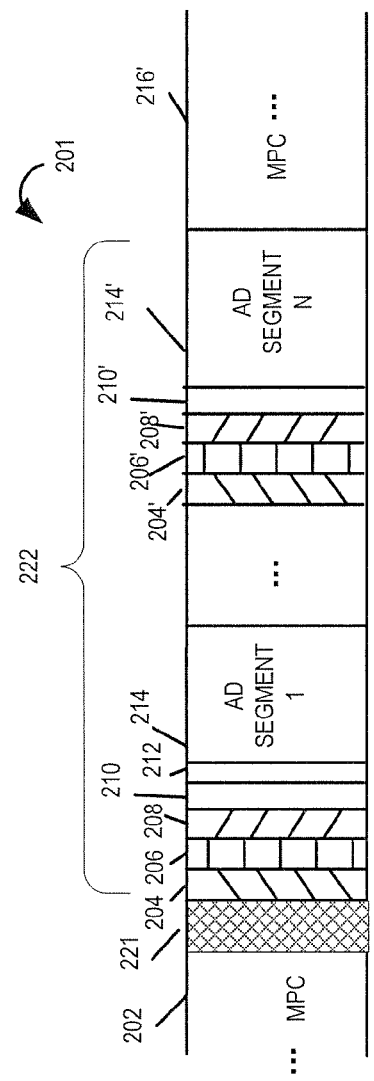
FIG. 2A
FIG. 2B

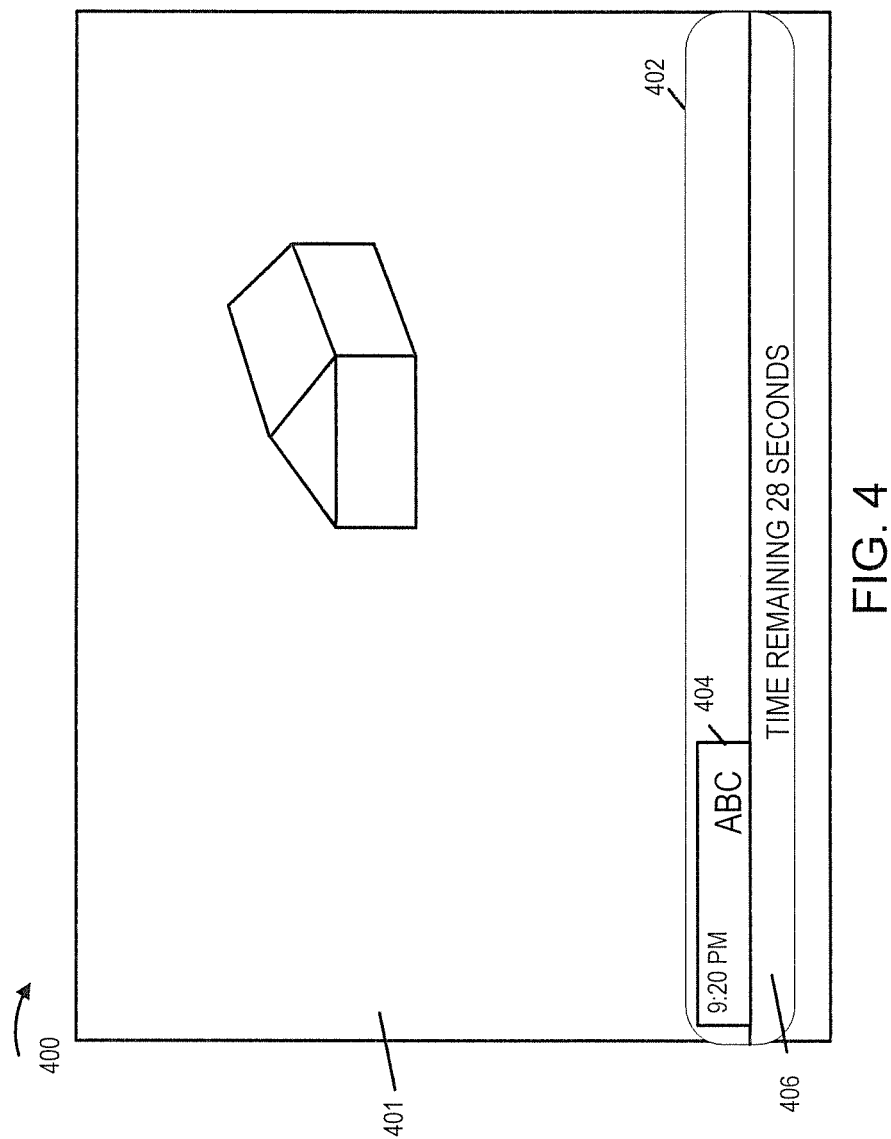

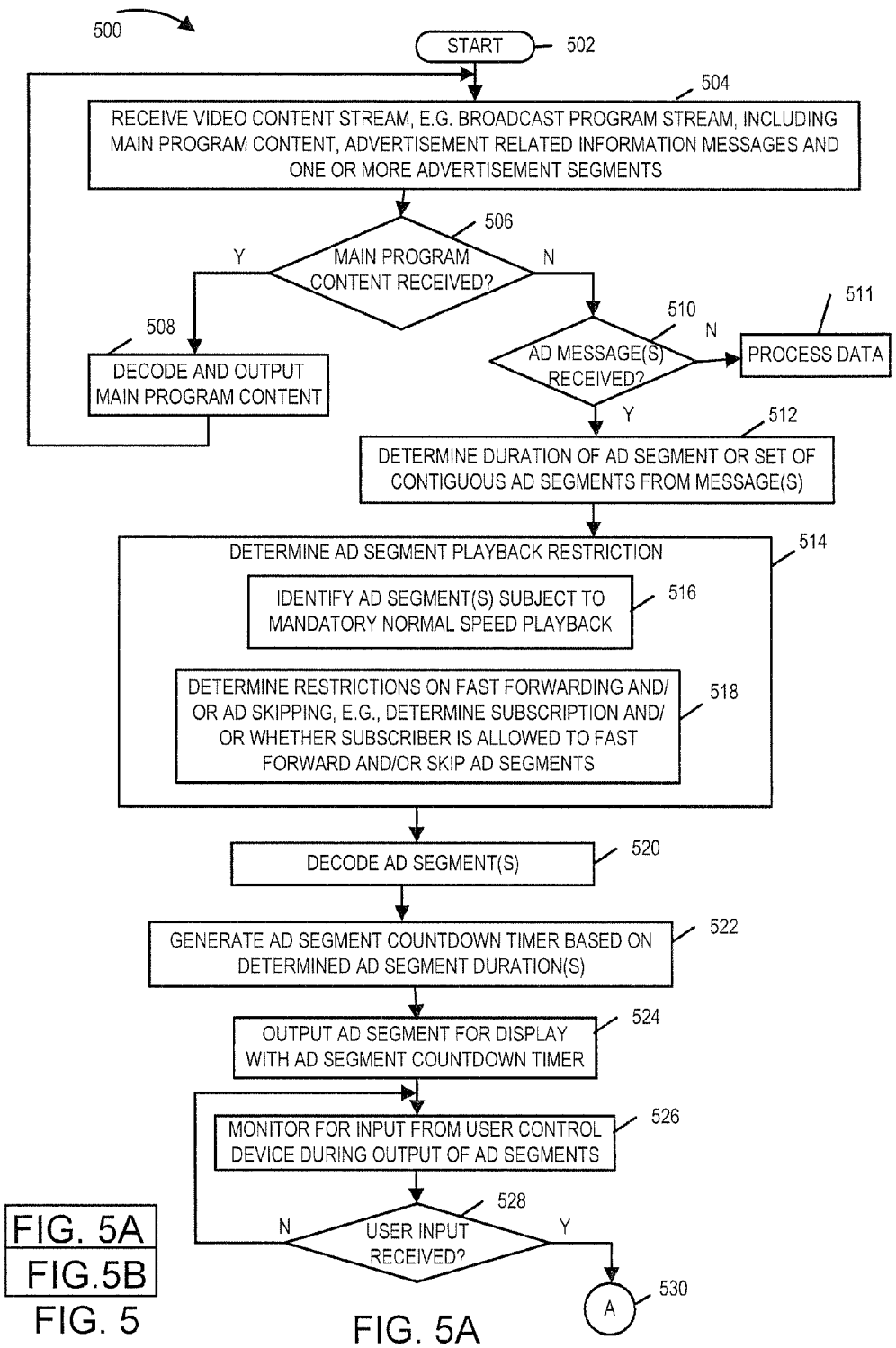

USE OF MULTIPLE EMBEDDED MESSAGES IN PROGRAM SIGNAL STREAMS

FIELD OF THE INVENTION

The invention relates to communications systems and methods, and more particularly, to a system and method using multiple embedded messages in program signal streams to support advertising related features including, e.g., an advertising countdown timer.

BACKGROUND OF THE INVENTION

Content distributors, including broadcasters, such as cable and satellite companies are often confronted from a business perspective between methods of generating revenue from ad based content in addition to, or as an alternative to, subscription based sources of revenue. For example, cable companies may generate revenue from cable service subscription fees with revenue from advertisements serving as an additional income source.

Many subscription based broadcast content distribution services are provided in combination with personal video recorders (PVRs), also known as digital video recorders (DVRs), which allow for enhanced capabilities with regard to recording broadcast program content. The DVRs provide subscribers a great deal of flexibility with regard to recording program content and playback of the content. Some DVRs offer such functions as "one-touch programming" for automatically recording every episode of a show for an entire season, "commercial advance" for automatically skipping through commercials while watching a recorded broadcast, an "on-screen guide" for looking up recorded programs to view, etc. The PVRs may also suggest programs for recording based on a user's viewing habit. These devices also enable the "pausing", "rewinding" and "fast-forwarding" of a live television ("TV") broadcast while it is being recorded. While the commercial skip function is attractive to subscribers, it can adversely affect add revenue since advertisers get little or no benefit from a commercial which is skipped.

Conventional content distributors, e.g., broadcasters, are coming under increasing competition from Internet based on-demand streaming services. Such services often provide video content on demand, e.g., by streaming short clips, following presentation of a mandatory advertisement which a viewer is prevented from fast forwarding or skipping. Often users of such services are not allowed to record program content for later playback and must watch the content in real time as it is streamed. By minimizing the content storage in the player device, the content distributor is given a fair amount of control over the content and can limit the supply of content so that the next segment of a program is only supplied after display of an advertisement. In such implementations, the short video segments and advertisements are often stored as separate files. The video server in such a system streams the advertisement stored in one file prior to the video clip stored in another file. While a viewer is allowed to fast forward through the video clip, e.g., a portion of a television program or movie, the user is made to watch the advertisement at normal playback speed. A user may be informed of the time remaining during the mandatory advertisement by way of a countdown time at the bottom of the screen during presentation of the mandatory advertisement. While the countdown timer normally indicates the time to the end of the advertisement, there may be downloading and/or streaming delays before the next video clip is actually presented. This is not normally an issue in the Internet streaming case since the viewer is often not paying for the content and is accustomed to delays as different segments are downloaded. The mandatory advertisement serves as a revenue source from which the Internet based content provider can generate revenue by charging advertisers for the displayed advertisement. The video clip and advertisement need not be kept to a particular broadcast schedule and thus can be of varying durations without affecting the encoding of the video clip. This is because the encoded video clip need not take into consideration or include information relating to an advertisement or its duration which can be determined separately by the on-demand server.

While non-optional advertisements have not generated the level of revenues that many subscription services have been able to generate, advertisement funded content distribution approaches of various types remain a source of competition with which more conventional broadcast content distribution services will have to contend with for the foreseeable future.

In view of the above discussion, it should be appreciated that there is a need for improved content distribution methods and/or content encoding approaches which will allow content distributors such as cable and satellite companies to optimize revenue generation from either advertisements and/or subscription services. It would be desirable if broadcast content providers could provide content in such a manner that commercial countdown timers could be associated with and displayed with regard to some commercials. It would also be desirable if the content distributor could control whether commercial presentation was mandatory and/or subject to user video control. It would also be desirable if a content distributor could make the commercials mandatory for some users but optional for others in a manner that allows the content distributor to try and maximize revenue from advertisements and/or subscriptions.

SUMMARY OF THE INVENTION

Methods and apparatus for providing improved control to a broadcast content distributor over the display and presentation of advertisements are described. Various embodiments also support the use and display of an advertisement remaining time countdown timer alone or in combination with various user controls relating to skipping, pausing and/or stopping a presentation prior to the end of an advertisement. Pausing may be in response to a signal from a user device indicating that the user wants to enable an auto pause function and/or in response to detection of a condition or signal indicative of an event such as receipt of a telephone call, an E-mail, an alert, e.g., which may be signaled through the use of an EBIF signal and/or one or more other non-user controlled signals.

In accordance with some embodiments messages are included in encoded video content. The messages are used to identify the start of an advertisement segment and also the duration of the advertisement segment. Such messages are referred to herein as advertising information messages. In addition to start and duration information, an advertising information message may, and in some embodiments does, include information on whether the viewing of all or a portion of the advertisement segment is mandatory, optional, or mandatory for some viewers but not others. In the case where viewing of all or a portion of the advertising segment is mandatory for some viewers but not others, the message includes an identifier which can be used by the playback device to identify viewers for which the viewing of the advertising segment is mandatory.

In some embodiments the advertisements messages are embedded into encoded broadcast content at the time of encoding with the advertisement segments being inserted later, e.g., by a local head end or, in some embodiments by the playback device used to playback the encoded content.

In some embodiments an advertisement segment itself may include multiple advertising segments. In some embodiments an advertising information message inserted into encoded content, prior to a contiguous block of advertising segments, includes information relating to each of the advertising segments. In other embodiments a separate advertising information message is included for each advertising segment even in the case where the encoded content stream includes multiple consecutive advertising segments.

Playback devices including set top boxes (STBs), including for example STBs with DVR capability, receive and process the encoded content including the advertisement information messages. During playback advertising information messages are detected. The timing information included therein is used to create an advertising countdown timer. The advertising countdown time displays, on a per segment basis, the time before the content of the program begins being displayed again as opposed to the advertisement content. For a set of contiguous advertising segments the countdown time will show the time remaining until the end of the set of advertising segments and the resumption of the displaying of the main program. Thus, a user viewing the screen during an advertisement is informed as to the amount of time remaining before the program content, as opposed to advertising content, will be displayed again.

Actions which a user viewing an advertisement segment may take are determined, in some embodiments, based on the advertisement information included in the advertisement message preceding an advertisement segment or segments and, optionally, subscriber information indicating the type or level of subscription, if any, the user has.

The advertisement information may indicate that one or more message segments cannot be skipped. For such advertisement segments, the user is not allowed to fast forward to skip the advertisement. Alternatively, the advertisement information may indicate that the user can skip some but not all advertisement segments in a set of advertisement segments. For example, if a set of advertisement segments includes six 30 second segments, the advertisement information may indicate that the user can skip or fast forward through the first five segments but must view the last 30 second segment at normal playback speed. Alternatively, a user may be allowed to skip or fast forward through commercials which satisfy some other user and/or output related criteria. For example, the advertising skip and fast forward restrictions may prevent a user from skipping or fast forwarding through a commercial which has not already been presented, and thus viewed, at normal playback speed but allow the user to skip or fast forward through commercials which he has viewed. In some embodiments commercials which are presented at normal playback are tracked for a period of time, e.g., by maintaining a list of commercials which have been presented within a predetermined time in the STB memory and/or in the network headend in the case of a network DVR embodiment, and the user is allowed to skip or fast forward through commercials which have already been presented at normal playback speed. The list of commercials which have been presented may include commercial identifier information, e.g., a PIC or other value corresponding to a particular commercial segment, which can be used to distinguish between different commercials and thus allow the STB or network headend to determine if a particular commercial segment has already been output for viewing within a predetermined time period. In still other embodiments, the advertisement information may include information indicating that some subscribers, e.g., paying service subscribers, can skip through some or all advertisement segments while other subscribers having a lower level service subscription or users who do not have any subscription are required to view the advertisement segments at normal playback speed. In some embodiments, not only fast forwarding or skipping is restricted during an advertisement, switching to another channel may be restricted for the playback of the advertising segment.

In at least one embodiment in which DVR functionality is supported, a commercial pause feature is supported. In one such embodiment, a user can select an auto pause feature during presentation of a commercial. In some but not necessarily all embodiments automatic commercial or other presentation pausing is also triggered automatically by a signal or event which is not initiated by a user and/or is not in response to a signal from a user device. For example in some embodiments in response to detection of a condition or signal indicative of an event such as receipt of a telephone call, an E-mail, and/or one or more other non-user controlled signals indicative of a condition which is likely to require a viewers attention and prevent the user from watching the presentation. For example, in some embodiments when an incoming call is detected, an E-mail is received or an alert is triggered, e.g., by an EBIF alert signal, presentation is automatically paused. Where a commercial is paused automatically in response to a signal which does not originate from a user control device, e.g., because of an incoming telephone call, presentation of the commercial will resume from the point at which it is paused in response to the incoming call or other event, when a user sends a signal from a control device to resume playback.

In the case of the commercial auto pause feature triggered by a user sending a signal via a user control device, the commercial is paused at a particular point in time before the end of the commercial. While a commercial may be allowed to progress to such a point for pauses triggered by incoming calls or alerts before the pause goes into effect, this is not the case in at least some embodiments since the presentation of the commercial during a telephone call will normally be an unwanted distraction from the call. Thus, at least in some embodiments, commercial and/or other presentations are immediately paused automatically in response to an incoming call, E-mail and/or alert signal. In some embodiments a user may configure the STB and/or network based subscriber settings to indicate the point in time which a commercial is to be paused in response to a user initiated commercial auto pause. For example, some users may specify the pause occur 10 seconds before the end of a commercial or commercial block while other users may specify 20 seconds before the end of the last commercial in a contiguous block of commercials. Users may also specify whether automatic pauses implemented in response to network signals are to be immediately implemented in response to a network signal or are to occur at the predetermined point in time before the end of a commercial presentation. User settings relating to auto pause functions may be, and in some embodiments are stored in the STB. In network based DVR embodiments such setting will normally be stored in the network headend.

When activated, the playback device, e.g., STB with DVR capability, pauses towards the end of playback of a commercial segment, e.g., shortly before the regular program resumes. The pausing may be based on the advertisement countdown time with the program pause being automatically enabled, e.g., 10 seconds prior to the resumption of the main program. As the pause is automatically activated the STB records and stores the program content. A user can resume playback by activating a resume key or issuing another playback command. In this manner, by combining the commercial countdown timer with auto pause functionality a user can leave the room during an advertisement segment without risking missing a portion of the program upon the user's return. For recorded content, an automatic commercial skip function can be implemented in a similar manner with the skip operation being based on the advertisement segment duration information included in the embedded advertisement's information message or messages.

In some embodiments, pause and other features such as fast forward and commercial skip are supported through the use of network based DVR functionality, e.g., here DVR functionality is supported in the cable or network headend. In other embodiments the functions are supported in systems using tru2way enabled third-party TVs. In network based DVR embodiments, the storing and pausing are implemented in the network headend with commands being communicated from a user's set top box to the cable network headend and the network headend modifying the video stream being provided to the user accordingly. Thus, in some embodiments, the autopause, commercial skip constraints, and other features of various embodiments are implemented via a network server altering the video content stream being supplied to a particular STB in accordance with advertisement message information, user input and/or optional restraints on a user to whom content is being supplied via a network and set top box.

The combination of advertisement message information, optional restraints on users to fast forward or skip advertisements, and ability to allow different subscribers to be treated differently with regard to advertisements based on their subscriptions, offers broadcasters a wide range of options in terms of their ability to maximize revenue from advertising, subscription fees and/or a combination of both. The inclusion of advertisement segment duration information allows the implementation of viewer friendly advertisement countdown times and the implementation of automatic pause or advertisement skip functions which are far more reliable than estimates of commercial duration based on an expected commercial duration of 30 seconds or some other metric.

Accordingly, the methods and apparatus of the present invention offer numerous advantages to both broadcasters and viewers. Broadcasters can optimize revenue generation based on the advertisement constraints communicated in the advertisement information messages of the present invention while viewers get enhanced functions and are provided advertisement countdown information as well, at least in some embodiments, as auto pause or advanced commercial skip functions.

Numerous additional benefits, features and embodiments are discussed in the detailed description which follows.

BRIEF DESCRIPTION OF THE DRAWINGS

FIG. 2a is an exemplary program stream, such as a video stream, including multiple main program segments, e.g. main program segments and ad segments, and various information messages, e.g., advertisement information messages, in accordance with one exemplary embodiment.

FIG. 2b shows another exemplary program stream, such as a video stream, including multiple main program segments, e.g. main program segments and ad segments, and various information messages, e.g., advertisement information messages, in accordance with one exemplary embodiment but with a set of advertisements segments and corresponding messages occurring together.

FIG. 4 is a display illustrating a frame of an ad segment with an ad segment countdown timer which is generated, output and displayed in conjunction with the ad segment in accordance with one embodiment of the present invention.

DETAILED DESCRIPTION

Figure 1:
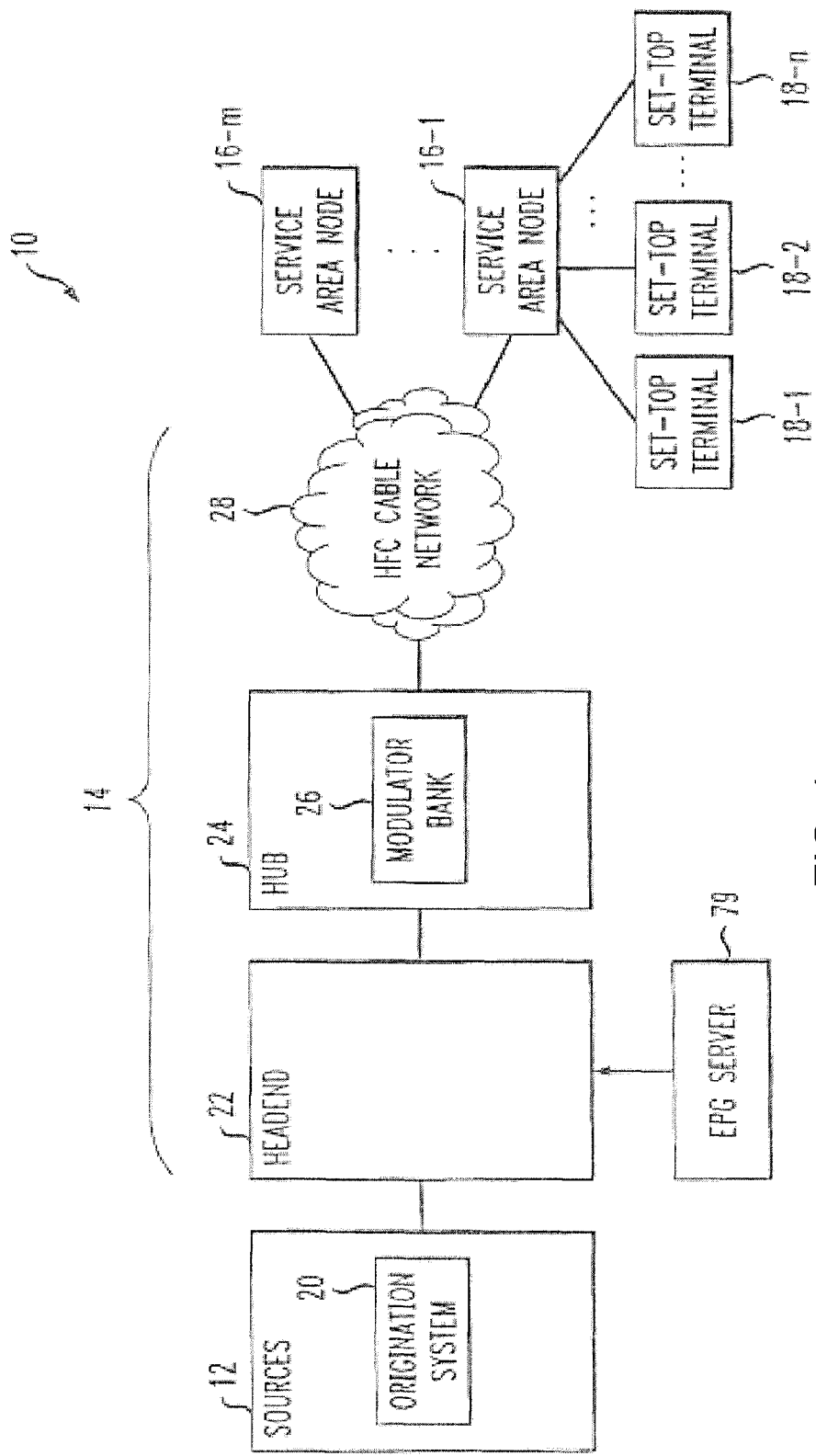
FIG. 1 is a block diagram of an exemplary broadband communications system implemented in accordance with the present invention.

With the advent of digital communications technology, many TV broadcast streams are transmitted in digital formats. For example, Digital Satellite System (DSS), Digital Broadcast Services (DBS), and Advanced Television Standards Committee (ATSC) broadcast streams are digitally formatted pursuant to the well known Moving Pictures Experts Group 2 (MPEG-2) standard. The MPEG-2 standard specifies, among others, the methodologies for video and audio data compressions which allow multiple programs, with different video and audio feeds, multiplexed in a transport stream traversing a single broadcast channel. Auxiliary data, including information messages, may be multiplexed into an MPEG-2 video stream. A set top box or other digital receiver may be used to decode an MPEG-2 encoded video stream, e.g., transport stream, and extract the desired program segments and message information there from.

The fixed-size data packets in a transport stream each carry a packet identifier ("PID") code. Packets in the same elementary streams all have the same PID, so that a decoder can select the elementary stream(s) it needs and reject the remainder. Packet-continuity counts are implemented to ensure that every packet that is needed to decode a stream is received. Based on the PID information, a decoder can identify packets corresponding to different program segments and messages. A PID table may be included in the video stream to provide information that can be used by the decoder to match packets based on the PIDs to different MPEG program streams. Different segments of a video stream may correspond to different program streams, e.g., a main program may be encoded separately from an advertising segment and may be identified by a different PID than is used to identify packets corresponding to an advertisement segment.

In the case of MPEG-2 streams, messages may be included in packets incorporated into the video stream. For example, one or more advertising information messages may be included in a video stream in accordance with the invention, e.g., prior to an ad segment for which the message(s) provide information. The advertising information messages may be included as auxiliary data in the video stream before the ad segment for which the information message provides information. The advertising information messages included in a video stream in accordance with the invention can be detected and processed by a decoder. As will be discussed below, the information provided in advertisement messages included in a video broadcast stream can be used to support advertisement countdown timers in accordance with the invention.

While advertisement messages can be inserted as auxiliary data in MPEG-2 streams, other methods of including advertisement information messages are also contemplated and are used in various embodiments.

Alternatively, and/or in addition to MPEG-2 information messages, cue tones can and in some embodiments are used to communicate advertisement related information. Cue tones may, and in some embodiments are, inserted into analog program streams by content providers to indicate insertion points for advertisements by cable systems and/or to provide additional advertisement information. American National Standard ANSI/SCTE 35 2001 (Formerly DVS 253), Digital Program Insertion Cueing Messages for Cable (May 8, 2001) referred to herein as the DVS 253 Standard, which is incorporated by reference herein, supports the splicing of MPEG-2 digital streams for the insertion of advertising and other content including information messages. Splice information may be provided in a splice information table associated with a particular program and/or in a cue message in the video stream. The splice information table and cue messages may be sent one or multiple times. For example, a cue message used to provide advertising segment related information may be sent 8, 5, 4 and 2 seconds prior to the splice event corresponding to the advertisement segment to which the cue message relates. It should be appreciated that some exemplary Standards are noted above to facilitate the understanding of the invention at least in some exemplary contexts. However, it should be appreciated that the invention is not limited to the exemplary Standards mentioned herein and can be used with a wide range of current and future Standards.

Unauthorized parties may intercept the splice information and/or advertising information messages of the present invention and try to use it to avoid the viewing of advertising or for other commercially deleterious purposes. In some embodiments to avoid the unauthorized alteration or use of such messages, the advertising information messages and/or splice information is encrypted. The intended recipients, e.g., trusted set top boxes, are provided with decoding information which is used to decode the encrypted advertisement information and optionally determine if the messages have been altered. Encryption for security purposes is optional and not used in all embodiments.

Prior to discussing these embodiments of the present invention, an exemplary communications system 10 which implements the invention will be discussed.

FIG. 1 is a block diagram of components of an exemplary broadband communications system 10 implemented in accordance with the present invention. The system includes one or more program sources 12, cable system 14 and a plurality of service area nodes 16-1 through 16-*m* in a neighborhood. Service area node 16-1, for example, is coupled to set-top terminals 18-1 through 18-*n*, at customer's TV's. Cable system 14 delivers information and entertainment services to set-top terminals 18-1 through 18-*n*.

Set top terminals 18-1, 18-2, 18-*n* may support DVR functionality and may include a display device or are coupled to a display device used to display video content after decoding. The display device may, and in some embodiments does, display an ad segment countdown timer generated in accordance with the present invention in conjunction with the display of one or more frames of an ad segment.

Figure 3:
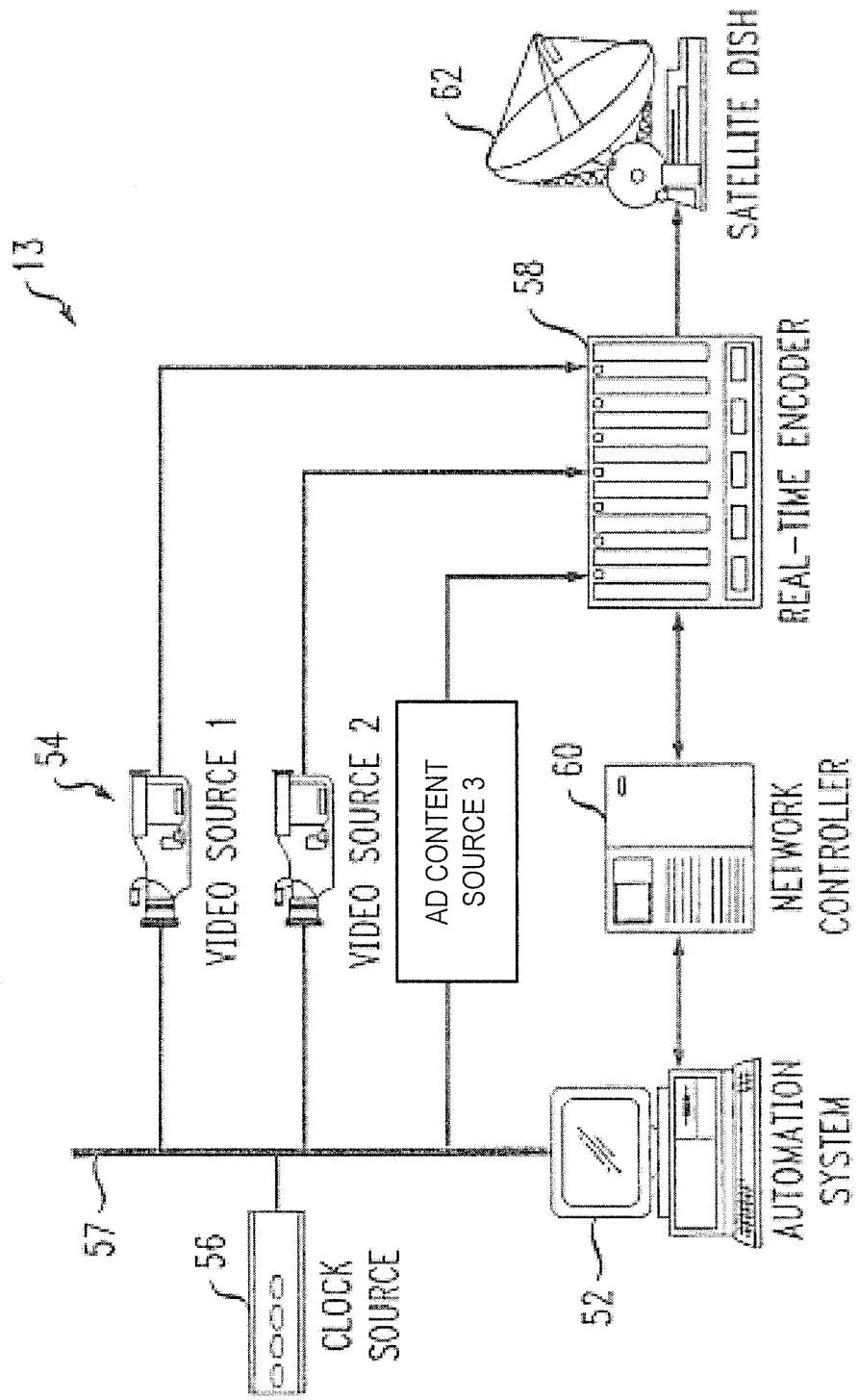
FIG. 3 is a block diagram of an example of an origination system of a source of programming of FIG. 1, for generating and transmitting video transport streams including advertisement segments and advertisement information messages, in accordance with an embodiment of the invention.

Sources 12 create and broadcast programming to cable system 14 through an origination system 20. Sources 12 include analog and digital satellite sources that typically provide the traditional forms of television broadcast programs and information services. Sources 12 also include terrestrial broadcasters, such as broadcast networks (CBS, NBC, ABC, etc., for example), which typically transmit content from one ground antenna to another ground antenna and/or via cable. Sources 12 may also include application servers, which typically provide executable code and data for application specific services such as database services, network management services, transactional electronic commerce services, system administration console services, application specific services (such as stock ticker, sports ticker, weather and interactive program guide data), resource management service, connection management services, subscriber care services, billing services, operation system services, and object management services; and media servers, which provide time-critical media assets such as Moving Pictures Experts Group 2 ("MPEG-2") standard encoded video and audio, MPEG-2 encoded still images, bit-mapped graphic images, PCM digital audio, three dimensional graphic objects, application programs, application data files, etc. Although specific examples of programs and services which may be provided by the aforementioned sources are given herein, other programs and services may also be provided by these or other sources without departing from the spirit and scope of the invention. An example of an origination system that inserts advertisement information messages used to provide information relating to advertisements including duration related information, playback restrictions and/or viewing requirement information relating to different subscribers is shown in FIG. 3. In addition to the advertisement information messages, the origination system 20 may, and in some embodiments does, insert one or more ad segments corresponding to the advertisement information messages which are inserted. Alternatively, the actual ad segments may be inserted later, e.g., by a local headend or even DVR with stored ad segments, prior to presentation of the video stream to an output device such as a display.

Cable system 14 includes headend 22, which processes program materials, such as TV program streams, for example, from sources 12 in digital and analog forms and may insert or replace ad segments for which advertisement information messages have been included in the video stream. Alternatively or in addition, the headend 22 may insert additional advertisement messages and corresponding ad segments. Digital TV streams may be formatted according to Motorola Digicipher System, Scientific Atlanta Powerview Systems, the Digital Satellite System (DSS), Digital Broadcast Services (DBS), or Advanced Television Standards Committee (ATSC) standards, for example. Analog TV program streams may be formatted according to the National Television Standards Committee (NTSC) or Phase Alternating Line (PAL) broadcast standard. Headend 22 extracts program content in the analog and digital TV streams and reformats the content to form one or more MPEG-2 encoded transport streams for transmission to users at set-top terminals 18-1 through 18-*n*. Such reformatting may be applied to those received streams already in an MPEG-2 format. This stems from the fact that the digital content in the received MPEG-2 streams are typically encoded at a variable bit rate (VBR). To avoid data burstiness, headend 22 may re-encode such digital content at a constant bit rate (CBR) to form transport streams in a conventional manner.

The generated video streams including various broadcast program and ad content maybe, e.g., MPEG transport streams, and are typically transmitted from headend 22 to hub 24 via Internet Protocol ("IP") transport over optical fiber.

Video streams as used herein is intended to refer to streams which include video, audio and related information and are used to convey video program content. Accordingly, a video stream as used here is not limited purely to a stream communicating only video data. The video streams may also be, or alternatively be, transmitted as intermediate frequency signals that have been amplitude modulated ("AM") or as a digital video broadcast (DYB) using a synchronous serial interface (ASI) that has also been AM modulated. Hub 24 includes modulator bank 26, among other components. Modulator bank 26 includes multiple modulators, each of which is used to modulate video streams onto different carriers. Hub 24 is connected to hybrid fiber/coax (HFC) cable network 28, which is connected to service area nodes 16-1 through 16-m. The video streams may be recorded in headend 22 so that the users at the set-top terminals may manipulate (e.g., pause, fast-forward or rewind) the programming content in the recorded streams in a manner described in U.S. patent application Ser. No. 10/263,015, filed Oct. 2, 2002, for example, which is incorporated by reference herein. In addition, in accordance with an embodiment of the invention, the video signal streams are processed and stored by headend 22 based, at least in part, on the advertisement information messages, as described further below.

FIG. 2a is a schematic representation of a portion of a signal stream 200, e.g. a video stream communicating main program content 202, 212, 216, e.g., TV program content, advertisement (AD) content in the form of a segment 214 and various messages 204, 206, 208, segmented with segmentation messages in addition to PIC (Program Identification Code) information 210. Program stream 200 includes main program content which corresponds to, e.g., one or more broadcast TV programs. The main program content is transmitted in multiple segments 202, 212, 216 which can be decoded and displayed. Between main program segments various messages, information and ad segments are included in the video stream 200 in accordance with the invention. For example an ad segment start time message 204 is included following main program content segment 202. Message 204 indicates the display start time, e.g., presentation start time, within the video stream of subsequent ad segment 214. Duration and/or end time of ad segment message 206 follows message 204 and includes duration ad segment information and/or the presentation end time of the subsequent ad segment 214. From the combination of messages 204 and 206 it is possible to determine the presentation start time and presentation duration of the subsequent ad segment 214 to which advertisement information messages 204, 206 relate. In addition to advertisement information messages 204, 206, ad video requirements information message 208 may, and in some embodiments is, included in the video stream 200. Video requirements information message 208 indicates whether or not users are permitted to skip or fast forward through ad segment 214. For example, ad viewing requirements information may indicate that ad segment 214 cannot be fast forwarded or skipped and is required to be output at a normal playback rate for its full duration. In such a case the ad segment 214 will be output at normal playback rate before a viewer is allowed to resume viewing of the main program content, e.g., content found in segment 216. In other cases, the ad viewing requirement information message may provide fast forwarding and skipping restrictions which are selective in nature, e.g., which apply to non-paying viewers but not to paying service subscribers. In such cases information message 208 may include information used to distinguish between service subscribers permitted to skip or fast forward through the associated ad segment 214 and users who are not permitted to skip or fast forward through the ad segment(S). Such information may be subscription identification information, e.g., a service plan, subscription level or some other numeric identifier which can be used by a receiving device such as a set top box, e.g., in combination with stored subscription and/or service plan information in the STB, to determine whether or not a user is permitted to fast forward or skip ad segment 214. PIC information 210 provides program identification information used to identify packets corresponding to the ad segment 214 and distinguish them from packets corresponding to the main program content which is identified using one or more other PIC values then are used for the ad segment 214 Note that the ad information messages 204, 206, 208 and related PIC information 210 precede the associated ad segment but are separated from the actual ad segment content 214 by some main program content 212. This allows a decoder to receive and process the ad segment information a short time before, e.g., 8, 10 or some other number of seconds before, the receipt of the actual ad segment. While a single set of messages 204, 206, 208 and PIC information 210 is shown, the set of information can, and in some embodiments is, repeated two or more times in video stream 200 prior to the occurrence of ad content 214 so that the chance of it being overlooked or lost due to a communication error is minimized.

FIG. 2B illustrates a portion 201 of an exemplary video content stream. The video content stream 201 includes many messages of the type previously described with regard to FIG. 2A and which are identified using the same reference numbers for the same or similar messages as were used in FIG. 2A. Note, however, that FIG. 2B illustrates an example where multiple ad segments and associated message occur consecutively as may be the case where multiple ads, e.g., 30 second commercials, are to be presented consecutively. Reference number 222 is used to indicate of set of contiguous ad segments and associated advertisement information messages. Primes are used to identify messages corresponding to ad segment N which are similar to those which correspond to ad segment 1. Restrictions on fast forwarding and/or skipping of ad segments is provided in the FIG. 2B example on an individual ad segment basis. In some embodiments different restrictions are provided for different ad segments. For example, the provided restriction information may indicate that the last ad segment cannot be skipped or fast forwarded through by any subscriber while the other ad segments can be skipped by selected subscribers. In some embodiments the broadcaster charges a premium fee to advertisers for the ad segments which cannot be skipped or fast forwarded through by any subscribers and a lower fee for ad segments subject to skipping or fast forwarding by some or all subscribers/users.

Note that in the FIG. 2 example, the video content stream includes an ad set information message 221 not shown in FIG. 2A. The ad set information message 221 provides information on the set of contiguous ad segments 222, e.g., indicating the total duration and, in some cases presentation start time of the first ad in ad segment set 222. While this information could be generated by a STB from the individual ad information messages, providing the cumulative ad segment duration information allows a STB to easily generate a countdown timer of the set of ad segments 222. Thus, in accordance with the invention a STB receiving video stream 201 can generate and output a cumulative ad countdown timer and or and/or individual ad segment count down timers.

The cumulative duration information provided in message 221 also facilitates implementation of the auto pause feature of the present invention. In the case of consecutive ad segments, the auto pause function implements a pause at a predetermined time prior to the end of the last ad segment in the set of consecutive ad segments. Thus, based on the start presentation time used to control the output of the first ad segment 214 and the duration of the set of ad segments 222, as determined from individual messages or ad set information message 221, the time at which a pause is to be automatically started during outputting of the ad set 222 can, and is, easily determined.

Having briefly described the structure and content of video streams 200, 201, an origination system which can, and in some embodiments does, generate such streams is discussed with regard to FIG. 3.

FIG. 3 is a block diagram of an example of an origination system 20 of a source 12 for uplinking video program transport signal streams, e.g., video content streams, with ad information messages in accordance with an embodiment of the invention. Origination system 13 comprises automation system 52, which controls operation of system 13. Segmentation points and corresponding main program and add segments of a broadcast video content stream may be identified by an operator through automation system 52. Video sources 54, such as Video Source 1, Video Source 2 and Video Source 3, are coupled to automation system 52 through data bus 57. Video sources 54 provide program signal streams including main program content and/or ad segment content to be segmented. Clock source 56 is also coupled to data bus 57, to provide timing for system 13. Encoder 58, in the example, is a real time encoder coupled to video sources 54 to receive and encode the analog video streams into an MPEG-2 program transport stream, for example. Network controller 60 is a control and management interface to encoder 58 and an interface to automation system 52 for insertion of segmentation messages. Transmitter 62, such as a satellite dish, is coupled to encoder 60. Transmitter 62 acts as an interface to transmit the program signal transport stream. An MPEG multiplexor (not shown) capable of extracting the program clock reference from the program stream may be used instead of or in addition to encoder 58. One or more previously recorded sources of video may be supplied to encoder 58 and/or multiplexed into the transport stream generated by encoder 58. While a real time encoder is shown, a non-real time encoder is used in some embodiments.

While the video content is supplied to encoder 58 from various sources 54, ad information messages of the type shown in FIGS. 2A and 2B are generated by the automation system 52 and supplied via network controller 60 to the encoder 58 for inclusion in the generated content stream prior to the ad content obtained from ad content source 3. Ad content source 3 may be a store of previously recorded ad segments which are output under control of the automation system 52 to the encoder 58 for inclusion in the content stream being generated by encoder 58.

FIG. 4 shows an exemplary display image 400 generated, outputted and displayed during an ad segment of broadcast program in accordance with one exemplary embodiment. The display image includes a frame 401 of an ad segment along with an information section 402 displayed at the bottom of the image 400. As illustrated the information section 402 includes an ad presentation countdown timer 406 generated in accordance with the invention in addition to a channel and current time field 404. The ad presentation countdown timer 406 displays the presentation time remaining in a set of consecutive ad segments or the time remaining in an individual ad segment depending on the embodiment. As should be appreciated in either embodiment during presentation of the last ad segment, e.g., ad segment N 214', in a set of consecutive ad segments the time remaining will be the time to the end of the last ad segment 214'.

As noted above, when the ad auto pause feature is activated during presentation of a set of ad segments the pause operation will automatically occur when the time remaining counter shown in image area 406 reaches a predetermined time, e.g., 8 seconds. Thus, the presentation will be paused when auto pause is enabled, the program stored, and the viewer will be allowed to resume normal playback from the point the presentation was paused without missing any of the main program content. Thus a viewer with the auto commercial pause feature can get up, leave the room and return without having to worry about making it back in time before the broadcast of the main program content resumes. This feature is particularly useful during real time broadcasts of sporting events where a snack or rest room break may be desired.

Figure 5B:
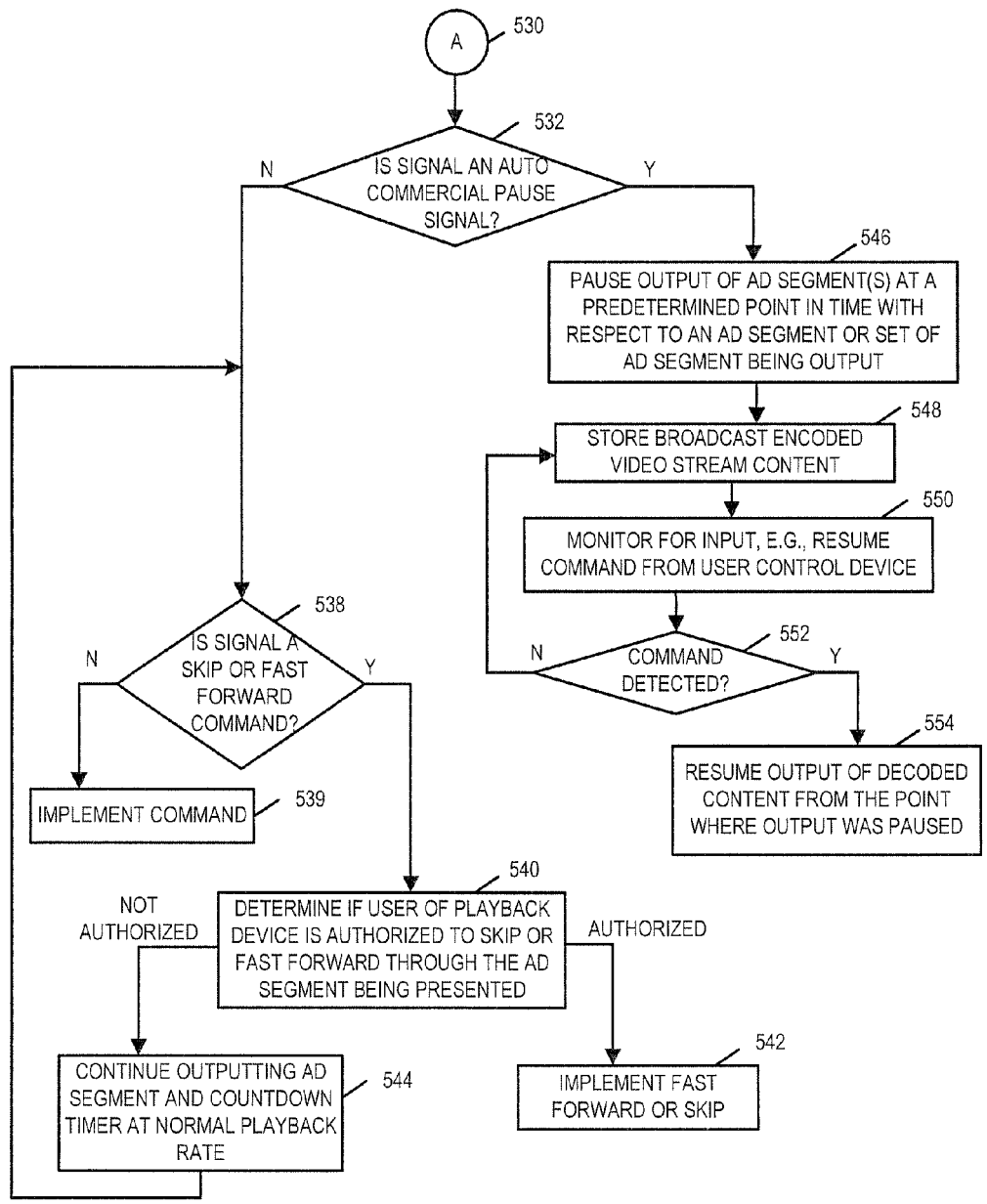
FIG. 5, which comprises the combination of FIGS. 5A and 5B, is a flow chart illustrating the steps of an exemplary method of processing a video stream in accordance with the present invention wherein an advertisement countdown timer is generated and output for display along with a frame or frames of an ad segment.

One exemplary method of the present invention, relating to processing of an video content stream and messages implemented in accordance with the present invention, such as those shown in FIG. 2, will now be discussed in detail with reference to FIG. 5 which comprises the combination of FIG. 5A and FIG. 5B.

The method 500 starts in step 502 with a receiver, e.g., STB with DVR capability, being powered on. Operation proceeds from start step 502 to step 504 wherein the STB receives a video content stream, e.g., broadcast program stream, including main program content, advertisement related information messages and one or more advertisement segments. Operation proceeds from step 504 to step 506, on an ongoing basis as segments, messages and other information of the video stream are received and processed.

In step 506 a determination is made if main program content was received and, if it was, operation proceeds to step 508 where the main program content is decoded and output for display. If something other than main program content was received, operation proceeds to step 510 wherein the received data is checked to see if it is an ad message or messages. If it is not an ad message the data is processed in the normal manner. If the data is an ad information message or message(s) operation proceeds to step 512 wherein the duration of an ad segment and/or set of consecutive received ad segments is determined. Then in step 514 ad segment playback restrictions are determined. Thus in step 514 what restrictions are applicable to the playback modification such as fast forwarding and skipping of the received ad segment(s) is determined from information included in one or more received ad information messages. Step 514 may include identifying step 516 of identifying ad segment(s) subject to mandatory normal speed playback, if any, and step 518 of determining what restrictions on fast forwarding and/or ad skipping are applicable and to what devices, subscribers or subscriptions the restrictions apply. This may, and in various embodiments is, determined from playback restriction information included in one or more ad information messages associated with a subsequent ad segment or segments to be decoded and presented.

Operation proceeds from step 514 to step 520 wherein the ad segment or segments to which steps 512 and 514 relate, are decoded. Operation proceeds from step 520 to step 522. In step 522 an ad segment countdown timer is generated based on the determined duration of the ad segment or set of consecutive ad segments. Then in step 524, the ad segment is output for display with the generated ad segment countdown timer. The displayed timer is updated with the output of consecutive decoded frames of the ad segment so that as each image of the ad is displayed the countdown timer information remains accurate. As shown in FIG. 4, channel and other information, e.g., current time information, may be displayed in addition to a frame of an ad segment.

As images from the ad segment are being displayed along with the ad segment countdown timer of the present invention, the receiver device monitors for input from a user control device, e.g., a remote control. This occurs in step 528. If user input is detected in step 528 operation proceeds via connecting node 530 to step 532. In step 532 the input signal is checked to determine if the user input is an auto commercial pause signal used to activate the auto commercial pause feature of the present invention. If the input is an auto commercial pause signal, operation proceeds from step 532 to step 546. In step 546, the output of the ad segment(s) is paused at a predetermined point in time e.g., a predetermined number of seconds prior to the end of a commercial segment or the set of commercial segments or at the end of the last ad segment in a set of commercial segments. With the pause operation having been automatically activated in step 546, e.g., based on the time of the ad segment countdown timer, operation proceeds to step 548 wherein received video stream content is stored, e.g., up until the main program ends or play is resumed in response to a user input.

Operation proceeds from step 548 to step 550. In step 550 the STB monitors for user input, e.g., input from a user control device used to resume playback. In step 552 if a command is detected, operation proceeds to step 554 in which output of decoded content is resumed from the point where the output was paused. Otherwise, if no command is detected in step 552 storage of the broadcast program will continue as indicated by the arrow proceeding from step 552 to step 548 until the point where a command is detected or the program ends.

If in step 532 it was determined that the received signal from the user control device was not an auto commercial pause signal, operation proceeds from step 532 to step 538 wherein a check is made to determine if the received signal is a skip or fast forward command. If the command is not a skip or fast forward command, e.g., a mute or other volume control command, the command is implemented by the STB in step 539. However, if the command is a skip or fast forward command, operation proceeds from step 538 to step 540. In step 540 a determination is made if the user of the playback device is authorized to skip or fast forward through the ad segment being presented. This determination is made based on the fast forwarding and/or skip ad restriction information, if any, included in ad information message corresponding to the ad or ad segments being output. As discussed above, the determination may be made by the STB based on subscription information, service level information, user identification information and/or other information known or stored in the STB which can be compared to received restriction information if any. Thus, the STB serves as an ad output policy enforcement point. Since many STBs and/or the software used by the receiver is provided or controlled by the broadcaster, e.g., cable company, the STB is a reasonably trustworthy device in most, if not all, cases.

If the user is authorized to fast forward or skip the ad segment(s) being output operation proceeds from step 540 to step 542 wherein the received skip or fast forward command is implemented. However, if the user of the playback device is not authorized to skip or fast forward through the ad segment(s) operation proceeds to step 544 wherein the ad segment and countdown timer continue to be output at the normal playback rate.

It should be appreciated that the above processing is exemplary and the sequence of steps may depend in a particular embodiment on the order in which messages, segments and commands from a user control device are received. Accordingly, the sequence of steps is not intended to be representative of the only order in which the steps may be performed.

Figure 6:
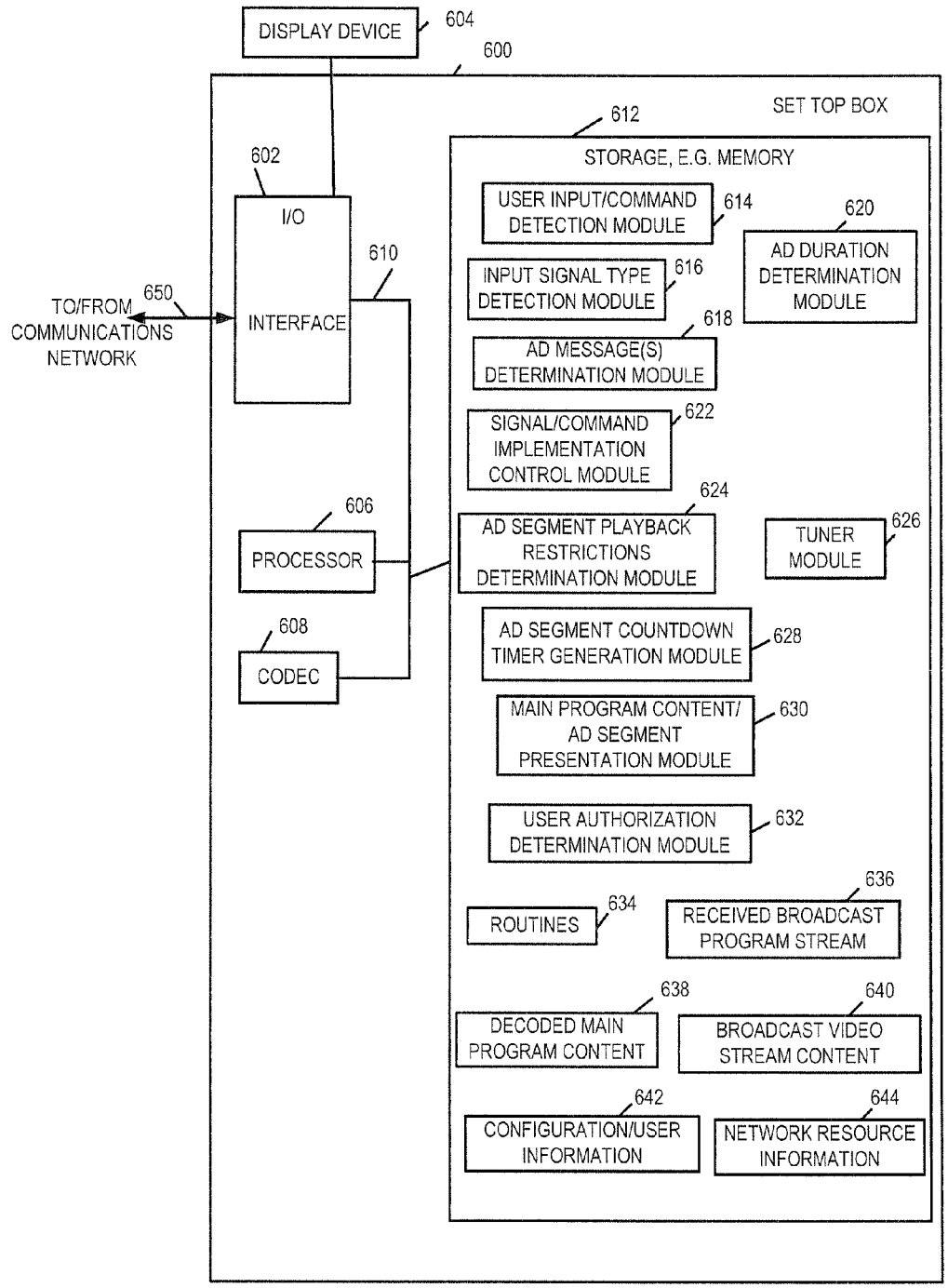
FIG. 6 shows an exemplary set top terminal which provides digital video recorder functionality in addition to advertisement countdown timer functionality in accordance with the invention.

FIG. 6 illustrates an exemplary receiver device, e.g., set top box 600, which is coupled to a display device 604. As should be appreciated the display device 604 may be integrated into the STB 600 or coupled thereto as in the case of a separate display device, e.g., Television. The STB includes an I/O interface 602 coupled to a communications network via a connection 650, e.g., a cable or fiber connection. The interface 602 may receiver a video content stream such as that shown in FIGS. 2A and/or 2B. The I/O interface 602 is coupled to a processor 606, a coder/decoder (CODEC) 608 and a memory 612 via a bus 610. Decoded video including ad segments including an ad countdown timer in accordance with the present invention can be supplied, e.g., output, for display to display device 604 via I/O interface 602. The memory 612 includes various modules including instructions, each of which when executed by the processor 606 control the set top box 600 to implement the step of FIG. 5 corresponding to the like named module of FIG. 6. For example, the memory which is a non-transitory computer readable medium includes a user input/command detection module 614, an input signal type detection module 616, an ad duration determination module 620, an ad messages determination module 618, a signal/command implementation control module 622, an ad segment playback restrictions determination module 624, a tuner module 626, an ad segment countdown timer generation module 628, a main program content/ad segment presentation module 630, and user authorization determination module 632. The memory 612 also includes various operating system and control routines 634 used to control the STB 600 and decoded main program content 638 generated by decoding one or more main program segments. The STB also includes stored broadcast video stream content 640, e.g., content stored following the auto pausing of the STB 600 during an ad segment or set of ad segments. Also included in memory 612 are configuration/user information 642 and network resource information 644. Configuration/user information may include various STB 600 setting as well as information about the service level of the user to whom the STB 600 corresponds, the subscription plan to which the STB 600 corresponds and/or a user identifier. This information may be used in determining whether or not a user has the right to fast forward or skip an ad segment. The network resource information 644 may include information about the network to which the STB 600 is connected, encryption information and or other network communications related information.

While described in the exemplary context of pause and other playback control functions being implemented in a STB, it should be appreciated that the methods and apparatus described in the present application are well suited for, and applicable to, network based PVR implementation as well.

The systems disclosed herein are in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors. While described in the context of a video delivery system, it should be appreciated that the methods and apparatus of the present invention are not limited to the delivery of video content and can be used to support delivery of audio content and/or other types of information content which may be subject to regional blackouts and/or other delivery restrictions.

In various embodiments system elements described herein are implemented using one or more modules which are used to perform the steps corresponding to one or more methods of the present invention. Each step may be performed by one or more different software instructions executed by a computer processor, e.g., a central processing unit (CPU) such as processor 306.

At least one system implemented in accordance with the present invention includes individual means for implementing each of the various steps which are part of the methods of the present invention. Each means may be, e.g., an instruction, processor, hardware circuit and/or combination of such elements used to implement a described step.

The commands described herein are often buffered and/or stored in memory. Accordingly some embodiments are directed to a machine readable medium including the commands discussed herein being stored on a non-transitory machine readable medium. Many of the above described methods or method steps can be implemented using machine, e.g., computer, executable instructions, such as software, included in a machine, e.g., computer, readable medium used to control a machine, e.g., general purpose computer with or without additional hardware, to implement all or portions of the above described methods, e.g., in one or more nodes. The machine readable medium may be, e.g., computer readable medium such as a memory device, e.g., RAM, floppy disk, etc. Accordingly, among other things, the present invention is directed to a machine-readable medium including machine executable instructions for causing a machine, e.g., processor and associated hardware, to perform one or more of the steps of the above-described method(s).

Numerous additional embodiments, within the scope of the present invention, will be apparent to those of ordinary skill in the art in view of the above description and the claims which follow.

The foregoing merely illustrates the principles of the invention. It will thus be appreciated that those skilled in the art will be able to devise numerous other arrangements which embody the principles of the invention and thus within the spirit and scope of the invention, which is defined in the claims, below.

What is claimed is:

1. A content playback method, the method comprising:
   determining an end time of an advertisement segment;
   receiving an automatic commercial pause signal from a user control device; and
   in response to said automatic commercial pause signal, pausing output of said advertisement segment at a predetermined point prior to the end of said advertisement segment, said predetermined point being a predetermined number of seconds before the end of said advertisement segment.

2. The content playback method of claim 1, further comprising:
   storing broadcast encoded video stream content corresponding to a first broadcast encoded video stream following said predetermined point in said advertisement segment; and
   in response to a command from said user control device received while said output of said advertisement segment was paused, outputting stored program content corresponding to said first broadcast encoded video stream.

3. The content playback method of claim 1, further comprising:
   receiving a signal indicating one of an incoming telephone call, alert and incoming E-mail; and
   in response to said signal, automatically pausing output of said advertisement segment.

4. The content playback method of claim 3, wherein said advertisement segment is immediately paused in response to said received signal.

5. The content playback method of claim 1, further comprising:
   monitoring for a presentation control signal while said advertisement segment is being output; and
   determining if the user is authorized to skip or fast forward through said advertisement segment in response to detecting, while said advertisement segment is being output, input from a user control device indicating a skip or fast forward command.

6. The content playback method of claim 5, wherein determining if the user is authorized to skip or fast forward through said advertisement segment includes checking to determine if the advertisement segment being output was previously output within a predetermined time of said detected input from a user control device indicating a skip or fast forward command.

7. The content playback method of claim 5, wherein determining if the user is authorized to skip or fast forward through said advertisement segment includes checking advertisement presentation restriction information included in an advertisement information message which is associated with said advertisement segment.

8. The content playback method of claim 5, wherein determining if the user is authorized to skip or fast forward through said advertisement segment includes comparing subscription information corresponding to said user to information in said advertisement segment used to identify subscribers who are authorized to skip or fast forward through said advertisement segment.

9. The method of claim 1, wherein pausing output of said advertisement segment at a predetermined point prior to the end of said advertisement segment includes:
   automatically pausing the output based on a time of an advertisement segment countdown timer.

10. The method of claim 9, wherein the time of said advertisement segment countdown timer is based on when the advertisement segment ends.

11. The method of claim 1, further comprising:
   generating a countdown timer indicating a time remaining until the end of the advertisement segment; and
   prior to reaching said predetermined point, outputting said advertisement segment for display at a normal playback rate with an indicator indicating the time remaining until the end of the advertisement segment.

12. The method of claim 11, further comprising:
   storing user setting information indicating if a commercial advertisement segment being output should be immediately paused in response to a network signal or paused at said predetermined point prior to the end of the said advertisement segment.

13. The method of claim 12, wherein said network signal is one of an E-mail signal, telephone call signal or an alert signal.

14. The method of claim 1, wherein said user control device is a remote control.

15. A content playback device, comprising:
   a duration determination module for determining the duration of an advertisement segment from one or more messages included in a first broadcast encoded video stream prior to an advertisement segment;

a countdown generator module for generating a countdown timer indicating a time remaining until the end of the advertisement segment;

an output module for outputting said advertisement segment for display at a normal playback rate with an indicator indicating the time remaining until the end of the advertisement segment;

a receiver for receiving an automatic commercial pause signal from a user control device; and an auto pause module responsive to the automatic commercial pause signal for pausing output of said advertisement segment at a predetermined point prior to the end of said advertisement segment, said predetermined point being a predetermined number of seconds before the end of said advertisement segment.

16. The content playback device of claim 15, wherein said duration determination module determines the duration from start and end times of said advertisement segment.

17. The content playback device of claim 15, wherein said user control device is a remote control.

18. A content playback device, comprising:

a duration determination module for determining the duration of an advertisement segment from one or more messages included in a first broadcast encoded video stream prior to an advertisement segment;

a countdown generator module for generating a countdown timer indicating a time remaining until the end of the advertisement segment;

an output module for outputting said advertisement segment for display at a normal playback rate with an indicator indicating the time remaining until the end of the advertisement segment;

a receiver for receiving an automatic commercial pause signal from a user control device; and an auto pause module responsive to the automatic commercial pause signal for pausing output of said advertisement segment at a predetermined point prior to the end of said advertisement segment, wherein said predetermined point prior to the end of said advertisement segment is a number of seconds specified by a user setting.

19. The content playback device of claim 18, wherein said predetermined point is a predetermined number of seconds before the end of said advertisement segment.

20. A content playback method, the method comprising:

determining an end time of an advertisement segment;

receiving an automatic commercial pause signal from a user control device; and in response to said automatic commercial pause signal, pausing at a content playback device, output of said advertisement segment at a predetermined point prior to the end of said advertisement segment, said predetermined point being a predetermined number of seconds before the end of said advertisement segment, wherein said predetermined number of seconds is specified by a user of said content playback device.

21. The method of claim 20, further comprising:

storing in said content playback device user setting information indicating the predetermined number of seconds specified by said user.

* * * * *